(12) United States Patent
Kasada (10) Patent No.: US 9,704,527 B2
(45) Date of Patent: Jul. 11, 2017

(54) MAGNETIC TAPE AND METHOD OF MANUFACTURING THE SAME

(71) Applicant: FUJIFILM Corporation, Tokyo (JP)

(72) Inventor: Norihito Kasada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/052,115

(22) Filed: Feb. 24, 2016

(65) Prior Publication Data

US 2016/0247530 A1    Aug. 25, 2016

(30) Foreign Application Priority Data

Feb. 25, 2015  (JP) ................................. 2015-034830

(51) Int. Cl.
    G11B 5/735   (2006.01)
    G11B 5/706   (2006.01)
    G11B 5/70    (2006.01)
    G11B 5/84    (2006.01)

(52) U.S. Cl.
    CPC ............... G11B 5/735 (2013.01); G11B 5/70 (2013.01); G11B 5/70605 (2013.01); G11B 5/8404 (2013.01)

(58) Field of Classification Search
    None
    See application file for complete search history.

(56) References Cited

U.S. PATENT DOCUMENTS

| | | | | |
|---|---|---|---|---|
| 5,445,881 A | * | 8/1995 | Irie | G11B 5/70 427/130 |
| 5,786,074 A | * | 7/1998 | Soui | G11B 5/70 428/323 |
| 6,254,964 B1 | * | 7/2001 | Saito | G11B 5/70 428/323 |
| 2001/0038928 A1 | * | 11/2001 | Nakamigawa | G11B 5/70 428/832.2 |
| 2003/0170498 A1 | * | 9/2003 | Inoue | G11B 5/735 428/845.4 |
| 2009/0027812 A1 | * | 1/2009 | Noguchi | G11B 5/00826 360/324.11 |
| 2013/0029183 A1 | * | 1/2013 | Omura | G11B 5/735 428/844.8 |
| 2016/0064025 A1 | * | 3/2016 | Kurokawa | G11B 5/71 428/840.4 |
| 2016/0093323 A1 | * | 3/2016 | Omura | G11B 5/733 428/840.3 |
| 2017/0032812 A1 | * | 2/2017 | Kasada | G11B 5/8404 |

FOREIGN PATENT DOCUMENTS

JP          2009-283082 A        12/2009

* cited by examiner

*Primary Examiner* — Kevin Bernatz (74) *Attorney, Agent, or Firm* — Sughrue Mion, PLLC (57) ABSTRACT

The magnetic tape has on one surface of a nonmagnetic support a magnetic layer containing ferromagnetic powder and binder, and on the other surface of the nonmagnetic support, a backcoat layer containing nonmagnetic powder and binder, wherein the total thickness of the magnetic tape is less than or equal to 4.80 μm, the backcoat layer contains one or more components selected from the group consisting of a fatty acid and a fatty acid amide, and a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape ranges from 35 to 60 atom %.

16 Claims, 1 Drawing Sheet

MAGNETIC TAPE AND METHOD OF MANUFACTURING THE SAME

CROSS-REFERENCE TO RELATED APPLICATIONS

This application claims priority under 35 U.S.C. 119 to Japanese Patent Application No. 2015-34830 filed on Feb. 25, 2015. The above application is hereby expressly incorporated by reference, in its entirety.

BACKGROUND OF THE INVENTION

Field of the Invention

The present invention relates to a magnetic tape and method of manufacturing the same.

Discussion of the Background

Magnetic recording media include tape-shaped media and disk-shaped media. Magnetic recording media in the form of tapes, that is, magnetic tapes, are primarily employed in storage applications such as data-backup tapes.

Japanese Unexamined Patent Publication (KOKAI) No. 2009-283082, which is expressly incorporated herein by reference in its entirety, discloses a magnetic tape having a backcoat layer on the opposite surface of a nonmagnetic support from the surface on which the magnetic layer is present. Japanese Unexamined Patent Publication (KOKAI) No. 2009-283082 further discloses that lubricant is contained in the backcoat layer of the magnetic tape.

SUMMARY OF THE INVENTION

Recording and reproduction of signals on the magnetic tape are generally conducted by running the magnetic tape within a drive. Normally, during the running, the backcoat layer comes into contact with constituent parts of the drive, such as rollers that feed out and/or wind up the magnetic tape within the drive. A high coefficient of friction during contact between the constituent parts of the drive and the surface of the backcoat layer may cause instability (decreases running stability) in running of the magnetic tape within the drive. In this regard, the present inventor assumes that lubricant that is contained in the backcoat layer can contribute to enhancing running stability by lowering the coefficient of friction during contact between constituent parts of the drive and the surface of the backcoat layer.

To increase the recording capacity per magnetic tape cartridge of magnetic tape, it is better to reduce the total thickness of the magnetic tape (that is, to render the magnetic tape thinner) and increase the total length of the tape that is contained in each magnetic tape cartridge. Accordingly, the present inventor conducted an investigation into how to reduce the thickness of a magnetic tape. In particular, when the total thickness of a magnetic tape having a backcoat layer decreases to less than or equal to 4.80 μm, a phenomenon may occur whereby running stability decreases. The present inventor determined that it was difficult to prevent such phenomenon simply by incorporating lubricant into the backcoat layer.

An aspect of the present invention provides for a magnetic tape affording good running stability in the form of a magnetic tape having a backcoat layer and having a total thickness reduced to less than or equal to 4.80 μm.

An aspect of the present invention relates to the following magnetic tape:

A magnetic tape, having on one surface of a nonmagnetic support a magnetic layer containing ferromagnetic powder and binder, and on the other surface of the nonmagnetic support, a backcoat layer containing nonmagnetic powder and binder, wherein the total thickness of the magnetic tape is less than or equal to 4.80 μm, the backcoat layer contains one or more components selected from the group consisting of a fatty acid and a fatty acid amide, and a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape ranges from 35 to 60 atom %.

The above magnetic tape can exhibit good running stability despite having a backcoat layer and the total thickness being less than or equal to 4.80 μm. The present inventor presumes this to be the result of the following.

X-ray photoelectron spectroscopy is an analysis method that is commonly referred to as electron spectroscopy for chemical analysis (ESCA) or X-ray photoelectron spectroscopy (XPS). Hereinafter, X-ray photoelectron spectroscopy will also be referred to as ESCA. ESCA is an analysis method that exploits the fact that photoelectrons are released when the surface of a sample being measured is irradiated with X-rays. It is widely employed as an analysis method for the surface layer portions of samples being measured. ESCA makes it possible to employ the X-ray photoelectron spectrum obtained by analysis of the surface of a sample being measured to conduct qualitative and quantitative analysis. Within the depth from the outer surface of the sample to the analysis position (also referred to hereinafter as the "detection depth") and the photoelectron take-off angle, the following equation generally holds true: detection depth is nearly equal to≈(nearly equal to) average free path of electrons×3×sin θ. In the equation, the detection depth is the depth at which 95% of the photoelectrons constituting the X-ray photoelectron spectrum are generated and θ is the photoelectron take-off angle. From the above equation, it will be understood that the smaller the photoelectron take-off angle, the shallower the depth from the sample surface that can be analyzed, and the larger the photoelectron take-off angle, the deeper the depth from the surface that can be analyzed. In analysis by ESCA at a photoelectron take-off angle of 10 degrees, a surface layer portion of only several nm in depth from the surface of the sample is normally the position analyzed. Accordingly, analysis by ESCA conducted at a photoelectron take-off angle of 10 degrees on the surface of the backcoat layer side of the magnetic tape permits compositional analysis of an extreme outer layer portion of only about several nm in depth from the surface of the backcoat layer side.

Additionally, the C—H derived C concentration is the proportion that carbon atoms C constituting C—H bonds account for relative to the 100 atom % of the total (based on atoms) of all elements detected by qualitative analysis by ESCA. The above magnetic tape contains one or more components selected from the group consisting of a fatty acid and a fatty acid amide in the backcoat layer. The Fatty acid and the fatty acid amide are both components that can function as lubricant in magnetic tapes. In a magnetic tape containing at least one of the fatty acid and the fatty acid amide in the backcoat layer, the C concentration derived from C—H determined by analysis by ESCA at a photoelectron take-off angle of 10 degrees is thought by the present inventor to be an indicator of the quantity of component (at least one component selected from the group consisting of a fatty acid and a fatty acid amide) on the extreme outer layer portion of the backcoat layer. This will be described in detail below. In an X-ray photoelectron spectrum (X-axis: bond energy; Y-axis: strength) obtained by ESCA analysis, the C1s spectrum contains information about the energy peak of the 1s orbital of carbon atoms C. In the C1s spectrum, the peak located in the vicinity of a bond energy of 284.6 eV is the C—H peak. This C—H peak is derived from the bond energy of the C—H bonds of organic compounds. In the extreme outer layer portion of the backcoat layer containing at least one component selected from the group consisting of a fatty acid and a fatty acid amide, the present inventor presumes that the main constituent component of the C—H peak is the component selected from the group consisting of a fatty acid and a fatty acid amide. The present inventor thus assumes that it can serve as an indicator of the quantity that is present, as set forth above.

The C—H derived concentration calculated from the C—H peak area ratio in the C1s spectrum obtained by X-ray photoelectron spectroscopy conducted at a photoelectron take-off angle of 10 degrees will also be denoted as the "backcoat layer outer layer portion C—H derived C concentration".

Based on the results of investigation conducted by the present inventor, it was revealed that stable running could be achieved (good running stability was possible) even when the total thickness was reduced to less than or equal to 4.80 μm in a magnetic tape in which the backcoat layer outer layer portion C—H derived C concentration fell within a range of 35 to 60 atom %. The present inventor attributed this to the fact that in a magnetic tape containing one or more components selected from the group consisting of a fatty acid and a fatty acid ester in the backcoat layer, in which the backcoat layer outer layer portion C—H derived C concentration fell within the above range, a larger quantity of the one or more components selected from the group consisting of a fatty acid and a fatty acid amide was present than in conventional magnetic tapes in the extreme outer layer portion of the backcoat layer. By contrast, by way of example, the above publication, Japanese Unexamined Patent Publication (KOKAI) No. 2009-283082, describes incorporating lubricant into the backcoat layer. However, based on the investigation conducted by the present inventor, simply incorporating lubricant into the backcoat layer tended not to yield a magnetic tape in which the backcoat layer outer layer portion C—H derived C concentration was greater than or equal to 35 atom %.

The present inventor presumes that above to be why the above magnetic tape can exhibit good running stability despite having a backcoat layer and having a total thickness of less than or equal to 4.80 μm. However, the above is merely a presumption, and is not intended to limit the present invention in any way. With regard to the phenomenon whereby running stability decreases when the total thickness of a magnetic tape having a backcoat layer is reduced to less than or equal to 4.80 μm, the present inventor assumes that reducing the total thickness may diminish the strength of the magnetic tape, causing the magnetic tape to become flexible. As a result, the state of contact between the surface of the backcoat layer and the constituent parts of the drive during running changes. However, this is merely a presumption and is not intended to limit the present invention in any way.

In one embodiment, the backcoat layer outer layer portion C—H derived C concentration falls within a range of 40 to 60 atom %.

In one embodiment, the nonmagnetic powder contained in the backcoat layer is selected from the group consisting of carbon black and nonmagnetic inorganic oxide powder.

In one embodiment, the nonmagnetic powder contained in the backcoat layer contains at least carbon black.

In one embodiment, the backcoat layer further contains a fatty acid ester.

In one embodiment, the ferromagnetic powder contained in the magnetic layer is selected from the group consisting of ferromagnetic hexagonal ferrite powder and ferromagnetic metal powder.

In one embodiment, the magnetic tape has a nonmagnetic layer containing nonmagnetic powder and binder between the nonmagnetic support and the magnetic layer.

A further aspect of the present invention relates to a method of manufacturing the above magnetic tape, including at least forming the magnetic layer and forming the backcoat layer, wherein the forming of the backcoat layer includes:

a coating step of forming a coating layer by coating a backcoat layer forming composition containing one or more components selected from the group consisting of a fatty acid and a fatty acid amide, nonmagnetic powder, binder, and solvent on the surface of a nonmagnetic support; and a heating and drying step of drying the coating layer by a heat treatment;

with a cooling step of cooling the coating layer being conducted between the coating step and the heating and drying step.

In one embodiment, the cooling step is conducted by placing the coating layer in a cooling environment of −10° C. to 0° C.

In one embodiment, the solvent contained in the backcoat layer forming composition contains ketone solvent.

In one embodiment, the backcoat layer forming composition further contains a fatty acid ester.

An aspect of the present invention can provide a magnetic tape having a backcoat layer and having a total thickness of less than or equal to 4.80 μm with good running durability.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The magnetic tape according to an aspect of the present invention is a magnetic tape, having on one surface of a nonmagnetic support a magnetic layer containing ferromagnetic powder and binder, and on the other surface of the nonmagnetic support, a backcoat layer containing nonmagnetic powder and binder, wherein the total thickness of the magnetic tape is less than or equal to 4.80 μm, the backcoat layer contains one or more components selected from the group consisting of a fatty acid and a fatty acid amide, and a C—H derived C (carbon) concentration calculated from a C—H peak area ratio in a C1s spectrum obtained by X-ray photoelectron spectroscopy conducted at a photoelectron take-off angle of 10 degrees on a surface on the backcoat layer side of the magnetic tape ranges from 35 to 60 atom %.

The above magnetic tape will be described in greater detail below.

<Backcoat Layer Outer Layer Portion C—H Derived C Concentration>

The backcoat layer outer layer portion C—H derived C concentration of the magnetic tape falls within a range of 35 to 60 atom %. From the perspective of further enhancing running durability, the backcoat layer outer layer portion C—H derived C concentration is desirably greater than or equal to 40 atom %, preferably greater than or equal to 50 atom %—the higher the better. From the perspective of facilitating manufacturing, the backcoat layer outer layer portion C—H derived C concentration of the magnetic tape is less than or equal to 60 atom %.

As set forth above, the backcoat layer outer layer portion C—H derived C concentration is a value that is obtained by ESCA analysis. The region analyzed is any 300 μm×700 μm region located on the surface on the backcoat layer side of the magnetic tape. Qualitative analysis is conducted by ESCA wide scan measurement (pass energy: 160 eV, scan range : 0 to 1,200 eV, energy resolution: 1 eV/step). Next, the spectra of all elements detected by qualitative analysis are obtained by narrow scan measurement (pass energy: 80 eV, energy resolution: 0.1 eV, scan range: set for each element so as to include the entire spectrum being measured). The atomic concentration (unit: atom %) of each element is calculated from the peak area in each of the spectra thus obtained. The atomic concentration (C concentration) of carbon atoms is calculated from the peak area of the C1s spectrum.

A C1s spectrum is obtained (pass energy: 10 eV, scan range: 276 to 296 eV, energy resolution: 0.1 eV/step). The C1s spectrum obtained is fitted by processing by the nonlinear least squares method by means of a Gauss-Lorentz complex function (Gauss component 70%, Lorentz component 30%). The peak of the C—H bond is separated in the C1s spectrum and the proportion of the C1s spectrum accounted for by the separated C-H peak (peak area ratio) is calculated. The C—H peak area ratio that is calculated is multiplied by the above C concentration to calculate the C—H derived C concentration.

The arithmetic average obtained by conducting the above processing three times at different positions on the surface on the backcoat layer side of the magnetic tape is adopted as the backcoat layer outer layer portion C—H derived C concentration. Specific forms of the above processing will be shown in Examples further below. Details will also be given further below. In one embodiment, carbon black is contained as the nonmagnetic powder in the backcoat layer. Carbon black contains carbon atoms. However, as set forth above, the backcoat layer outer layer portion C—H derived C concentration is the proportion accounted for by the carbon atoms C constituting C—H bonds in an organic compound. Accordingly, the present inventor assumes that the carbon atoms contained in carbon black make no contribution to the backcoat layer outer layer portion C—H derived C concentration.

A desirable means of adjusting the backcoat layer outer layer portion C—H derived C concentration set forth above to within the above range is to implement a cooling step in the backcoat layer forming step, as will be described further below. However, the magnetic tape of an aspect of the present invention is not limited to being manufactured through such a cooling step.

<Fatty Acid and Fatty Acid Amide>

The above magnetic tape contains one or more components selected from the group consisting of a fatty acid and fatty acid amide in the backcoat layer. It suffices for either a fatty acid or a fatty acid amide to be contained in the backcoat layer, and both can be contained. As set forth above, the present inventor assumes that these components are present in large quantity in the extreme outer layer portion of the backcoat layer and can contribute to enhancing the running stability of a magnetic tape that has been reduced in total thickness to less than or equal to 4.80 μm.

Examples of the fatty acid are lauric acid, myristic acid, palmitic acid, stearic acid, oleic acid, linoleic acid, linolenic acid, behenic acid, erucic acid, and elaidic acid. Stearic acid, myristic acid, and palmitic acid are desirable, and stearic acid is preferred. The fatty acid can also be incorporated into the magnetic layer in the form of salts such as metal salts.

Examples of the fatty acid amide are amides of various fatty acids, such as amide laurate, amide myristate, amide palmitate, and amide stearate.

For the fatty acid and fatty acid derivatives (amides, esters described further below, and the like), the fatty acid derived moiety of a fatty acid derivative desirably has a structure that is identical or similar to that of the fatty acid which is employed together. As an example, when employing stearic acid as a fatty acid, it is desirable to employ amide stearate and/or stearic acid ester.

The quantity of fatty acid can be, for example 0.1 to 10.0 weight parts, desirably 1.0 to 7.0 weight parts, per 100.0 weight parts of nonmagnetic powder as the content in the backcoat layer forming composition. When two or more different fatty acids are added to the backcoat layer forming composition, the content refers to the combined content thereof. Unless specifically stated otherwise, this similarly applies to the contents of other components in this specification.

The content of fatty acid amide in the backcoat layer forming composition can be, for example, 0.1 to 3.0 weight parts, desirably 0.1 to 1.0 weight parts, per 100.0 weight parts of nonmagnetic powder contained therein.

<Fatty Acid Ester>

The above-described fatty acid and fatty acid amide are components capable of functioning as lubricant. Although a fatty acid ester is also a component capable of functioning as lubricant, the present inventor presumes that it produces no (or only a slight) influence on running stability in magnetic tapes with total thicknesses of less than or equal to 4.80 μm. Lubricant can be roughly classified into fluid lubricant and boundary lubricant. It is thought that the fatty acid ester can function as fluid lubricant while the fatty acid amide and fatty acid can function as boundary lubricant. Boundary lubricant is thought to be lubricant that adsorbs to the surface of powder and form strong lubricating film, thereby reducing contact friction. By contrast, fluid lubricant is thought to be lubricant that forms a liquid film on the backcoat layer surface itself, reducing friction by the flowing of this liquid film. Thus, the fatty acid ester may act differently from the fatty acid and the fatty acid amide as lubricant. The present inventor assumes this to be why the fatty acid ester produces a different influence on running stability than the fatty acid and the fatty acid amide. The fatty acid ester is generally said to be lubricant that contributes to enhancing the running durability of magnetic tapes. Thus, by way of example, the fatty acid ester can be incorporated into the backcoat layer to enhance resistance to scratching.

Examples of the fatty acid ester are esters of the various fatty acids set forth above, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The quantity of fatty acid ester is, for example, 0 to 10.0 weight parts, desirably 1.0 to 7.0 weight parts, per 100.0 weight parts of nonmagnetic powder as the content in the backcoat layer forming composition.

One or more components selected from the group consisting of the fatty acid, fatty acid amide, and fatty acid ester set forth above can also be contained in layer(s) other than the backcoat layer. For example, one or more of these components can be contained in the magnetic layer and/or in the nonmagnetic layer, described further below. The contents of the various components in such cases are as follows. For the nonmagnetic layer, "the content relative to the nonmagnetic powder contained in the backcoat layer" can be changed to read as, "the content relative to the nonmagnetic powder contained in the nonmagnetic layer" and applied. For the magnetic layer, "the content relative to the nonmagnetic powder" can be changed to read as, "the content relative to the ferromagnetic powder" and applied.

The various layers contained in the magnetic tape will be described in greater detail.

<Magnetic Layer>

(Ferromagnetic Powder)

Various powders that are commonly employed as ferromagnetic powder in the magnetic layers of magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 to 90 weight %, and preferably falls within a range of 60 to 90 weight %. A high fill rate is desirable from the perspective of increasing the recording density.

(Binder, Curing Agent)

The magnetic tape according to an aspect of the present invention contains binder along with ferromagnetic powder in the magnetic layer. Polyurethane resins, polyester resins, polyamide resins, vinyl chloride resins, acrylic resins such as those provided by copolymerizing styrene, acrylonitrile, methyl methacrylate and the like, cellulose resins such as nitrocellulose, epoxy resins, phenoxy resins, polyvinylacetal, polyvinylbutyral, and other polyvinyl alkylal resins can be employed singly, or as mixtures of multiple resins, as the binder contained in the magnetic layer. Among these, desirable resins are polyurethane resin, acrylic resins, cellulose resins, and vinyl chloride resins. These resins can also be employed as binders in the backcoat layer and/or in the nonmagnetic layer described further below. Reference can be made to paragraphs 0028 to 0031 of Japanese Unexamined Patent Publication (KOKAI) No. 2010-24113, which is expressly incorporated herein by reference in its entirety, with regard to the above binders.

Further, a curing agent can be employed along with the resin suitable for use as the binder. Polyisocyanate is suitable as the curing agent. Reference can be made to paragraphs 0124 to 0125 in Japanese Unexamined Patent Publication (KOKAI) No. 2011-216149, for details regarding polyisocyanates. The curing agent can be added to the magnetic layer forming composition in a quantity of, for example, 0 to 80.0 weight parts, preferably 50.0 weight parts to 80.0 weight parts from the perspective of enhancing the coating strength, per 100.0 weight parts of binder.

(Additives)

Additives can be added to the magnetic layer as needed. Examples of additives are nonmagnetic fillers, dispersing agents, dispersing adjuvants, antifungal agents, antistatic agents, oxidation inhibitors, and carbon black. Examples of nonmagnetic fillers are nonmagnetic fillers capable of functioning as abrasives, and nonmagnetic fillers capable of functioning as protrusion-forming agents that suitably protrude from the surface of the magnetic layer and form protrusions (such as nonmagnetic colloidal particles). Additives can be suitably selected in the form of commercial products for use based on the desired properties. As set forth above, one or more components selected from the group consisting of the fatty acid, fatty acid amide, and fatty acid ester can be contained in the magnetic layer.

The magnetic layer can be provided on the surface of a nonmagnetic support directly, or indirectly over a nonmagnetic layer. Details regarding the nonmagnetic layer and nonmagnetic support will be given further below.

<Nonmagnetic Layer>

In the magnetic tape according to an aspect of the present invention, a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 to 90 weight %, preferably within a range of 60 to 90 weight %.

For other details regarding binder, additives, and the like in the nonmagnetic layer, known techniques relating to nonmagnetic layers can be applied. As a further example, known techniques relating to magnetic layers can be applied with regard to the quantity and type of binders and the quantity and type of additives.

As set forth above, one or more components selected from the group consisting of the fatty acid, fatty acid amide, and fatty acid ester can be contained in the nonmagnetic layer.

<Backcoat Layer>

The magnetic tape according to an aspect of the present invention has a backcoat layer on the opposite surface of the nonmagnetic support from the surface on which the magnetic layer is present. As set forth above, the backcoat layer contains one or more components selected from the group consisting of a fatty acid and a fatty acid amide, and can optionally contain a fatty acid ester. In addition to these components, the backcoat layer also contains nonmagnetic powder and binder, and can also optionally contain known additives. Known techniques relating to the backcoat layer can be applied for other details regarding binders, additives, and the like in the backcoat layer. Known techniques relating to the magnetic layer and/or the nonmagnetic layer can also be applied.

Reference can be made to the descriptions regarding the nonmagnetic powder in the nonmagnetic layer set forth above, for the nonmagnetic powder in the backcoat layer. Either one of, or both, carbon black and nonmagnetic powder other than carbon black can be employed as nonmagnetic powder in the backcoat layer. It is desirable to employ either carbon black or carbon black and nonmagnetic powder other than carbon black. Examples of nonmagnetic powder other than carbon black are nonmagnetic inorganic powder. Specific examples are α-iron oxide and other iron oxides, titanium dioxide and other titanium oxides, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, titanium carbide, and other nonmagnetic inorganic powders. Nonmagnetic inorganic oxide powder is desirable nonmagnetic inorganic powder; α-iron oxide and titanium oxide are preferred; and α-iron oxide is of greater preference.

The nonmagnetic powder other than carbon black can be of any shape, such as acicular, spherical, polyhedral, or plate-like. The average particle size of such nonmagnetic powder desirably falls within a range of 0.005 to 2.00 μm, preferably within a range of 0.01 to 0.20 μm. The specific surface area by the BET method (BET specific surface area) of the nonmagnetic powder desirably falls within a range of 1 to 100 $m^2/g$, preferably 5 to 70 $m^2/g$, and more preferably, within a range of 10 to 65 $m^2/g$. The average particle size of the carbon black, for example, falls within a range of 5 to 80 nm, desirably 10 to 50 nm, and preferably, falls within a range of 10 to 40 nm. Reference can be made to the description set forth above of the nonmagnetic powder in the nonmagnetic layer with regard to the content (fill rate) of the nonmagnetic powder in the backcoat layer. The content of carbon black per 100.0 weight parts of the total quantity of nonmagnetic powder, for example, falls within a range of 10.0 to 100.0 weight parts. The entire quantity of nonmagnetic powder can be carbon black. The entire quantity of nonmagnetic powder can also consist of a nonmagnetic powder other than carbon black.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Layer Structure>

The thickness of the nonmagnetic support and various layers in the magnetic tape according to an aspect of the present invention are as follows. The thickness of the nonmagnetic support is desirably 3.00 to 4.50 μm. The thickness of the magnetic layer, which can be optimized for the saturation magnetization of the magnetic head employed, the head gap length, and the bandwidth of the recording signal, is generally 0.01 to 0.15 μm (10 nm to 150 nm). From the perspective of high-density recording, it is desirably 0.02 to 0.12 μm (20 nm to 120 nm), preferably 0.03 to 0.10 μm (30 nm to 100 nm). The magnetic layer can be comprised of a single layer, or the magnetic layer can be separated into two or more layers with different magnetic characteristics. Known multilayer magnetic layer structures can be applied.

The thickness of the nonmagnetic layer is, for example, 0.10 μm to 1.50 μm, and desirably 0.10 μm to 1.00 μm. The nonmagnetic layer of the magnetic tape according to an aspect of the present invention may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

The thickness of the backcoat layer is desirably less than or equal to 0.90 μm, preferably 0.10 to 0.70 μm.

<Total Thickness of the Magnetic Tape>

From the perspective of increasing recording capacity, it is desirable to reduce the thickness of the magnetic tape to increase the recording capacity per magnetic tape cartridge. The magnetic tape according to an aspect of the present invention has a total thickness of less than or equal to 4.80 μm. Thus, it is a desirable magnetic tape from the perspective of increasing recording capacity. However, as set forth above, the phenomenon of a drop in running stability was observed in magnetic tapes having a backcoat layer and having a total thickness of less than or equal to 4.80 μm. An aspect of the present invention can resolve the drop in running stability in a magnetic tape containing one or more components selected from the group consisting of a fatty acid and a fatty acid amide in the backcoat layer by keeping the backcoat layer outer layer portion C—H derived C concentration to within the range set forth above. The total thickness of the magnetic tape is, for example, less than or equal to 4.50 μm, or less than or equal to 4.30 μm. However, at less than or equal to 4.80 μm, an adequate enhancement in recording capacity can be achieved. Thus, a total thickness in excess of 4.50 μm or 4.30 μm is also possible. From the perspective of ease of handling (the handling property of) the magnetic tape, the total thickness of the magnetic tape is desirably greater than or equal to 1.0 μm.

The thickness of the various layers and nonmagnetic support of the magnetic tape, as well as the total thickness, can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

\<Manufacturing Process\>
(Preparation of Various Layer Forming Compositions)

The compositions (coating liquids) for forming the magnetic layer, nonmagnetic layer, and backcoat layer normally contain solvent in addition to the various components set forth above. Examples of the solvent are the various organic solvents commonly employed in manufacturing particulate magnetic recording media. Specific examples of the solvent that are suitable for use are, in any ratio, acetone, methyl ethyl ketone, methyl isobutyl ketone, diisobutyl ketone, cyclohexanone, isophorone, tetrahydrofuran, and other ketones; methanol, ethanol, propanol, butanol, isobutyl alcohol, isopropyl alcohol, methyl cyclohexanol, and other alcohols; methyl acetate, butyl acetate, isobutyl acetate, isopropyl acetate, ethyl lactate, glycol acetate, and other esters; glycol dimethyl ether, glycol monoethyl ether, dioxane, and other glycol ethers; benzene, toluene, xylene, cresol, chlorobenzene, and other aromatic hydrocarbons; methylene chloride, ethylene chloride, carbon tetrachloride, chloroform, ethylene chlorohydrin, dichlorobenzene, and other chlorinated hydrocarbons; N,N-dimethyl formamide; and hexane. Of these, from the perspective of solubility of the binders that are commonly employed in particulate magnetic recording media, one or more ketone solvents are desirably contained in the backcoat layer forming composition. The quantity of solvent in the backcoat layer forming composition is not specifically limited and can be identical to that of compositions that form the various layers of a common particulate magnetic recording medium. The above description can be applied to the solvent contained in the magnetic layer forming composition and nonmagnetic layer forming composition.

The process of preparing the compositions for forming the various layers normally includes at least a kneading step, a dispersion step, and mixing steps provided before and after these steps as needed. Each of these steps can be divided into two or more stages. All of the starting materials in the form of ferromagnetic powder, nonmagnetic powder, fatty acid, fatty acid amide, binder, various optionally added additives, solvent, and the like that are employed in the present invention can be added at the start, or part way through, any of these steps. An individual starting material can be divided for addition in two or more steps. For example, in preparing the composition for forming the magnetic layer, it is desirable to separately disperse the abrasive liquid that is a composition containing the abrasive and the magnetic liquid that is a composition containing the ferromagnetic powder.

An open kneader, continuous kneader, pressurized kneader, extruder, or some other device with powerful kneading force is desirably employed in the kneading step. Details regarding these kneading processes are given in Japanese Unexamined Patent Publication (KOKAI) Heisei Nos. 1-106338 and 1-79274, which are expressly incorporated herein by reference in their entirety.

Glass beads or some other form of bead can be employed to disperse the compositions for forming the various layers. High-density dispersion beads in the form of zirconia beads, titania beads, and steel beads are suitable as such dispersion beads. The particle diameter and fill rate of these dispersion beads can be optimized for use. A known disperser can be employed.

(Coating Step, Cooling Step, and Heating and Drying Step)

The magnetic layer can be formed, for example, by multilayer coating the magnetic layer forming composition either successively or simultaneously with the nonmagnetic layer forming composition. Reference can be made to Japanese Unexamined Patent Publication (KOKAI) No. 2010-231843, paragraph 0066, for details regarding coating to form the various layers. The content of the above publication is expressly incorporated herein by reference in its entirety.

In one desirable embodiment, the magnetic tape of an aspect of the present invention can be manufactured by sequential multilayer coating. The manufacturing steps in sequential multilayer coating are desirably conducted as follows. The nonmagnetic layer is formed by a coating step of forming a coating layer of the nonmagnetic layer forming composition on the nonmagnetic support by coating; and a heating and drying step of drying by a heat treatment of the coating layer that has been formed. The magnetic layer forming composition is then coated on the nonmagnetic layer that has been formed in a coating step to form a coating layer, followed by a heating and drying step of drying by a heat treatment of the coating layer that has been formed to form the magnetic layer.

The backcoat layer is formed on the opposite surface of the nonmagnetic support from the surface on which the magnetic layer has been formed (or is to be formed). It is desirable for the backcoat layer to be formed by a coating step of forming a coating layer by coating the backcoat layer forming composition on the surface of the nonmagnetic support, and a heating and drying step of heat treating the coating layer that has been formed to dry it.

The coating step for forming the backcoat layer can be conducted with a backcoat layer forming composition containing one or more components selected from the group consisting of a fatty acid and a fatty acid amide. Conducting a cooling step to cool the coating layer between the coating step and the heating and drying step is desirable to adjust the backcoat coat layer outer layer portion C—H derived C concentration to within the range set forth above in a magnetic tape having a backcoat layer containing one or more components selected from the group consisting of a fatty acid and a fatty acid amide. Although the reason for this is unclear, the present inventor presumes that cooling the coating layer of the backcoat layer forming composition prior to the heating and drying step may facilitate migration of the above components (fatty acid, fatty acid amide) to the surface of the backcoat layer during volatilization of the solvent during the heating and drying step. However, this is merely a presumption, and is not intended to limit the present invention in any way.

That is, an aspect of the present invention relates to a method of manufacturing a magnetic tape according to an aspect of the present invention, including at least forming of the magnetic layer and forming of the backcoat layer, where the forming of the backcoat layer includes:

a coating step of forming a coating layer by coating a backcoat layer forming composition containing one or more components selected from the group consisting of a fatty acid and a fatty acid amide, nonmagnetic powder, binder, and solvent on the surface of a nonmagnetic support; and a heating and drying step of drying the coating layer by means of a heat treatment;

with a cooling step of cooling the coating layer being conducted between the coating step and the heating and drying step.

A specific embodiment of the above manufacturing method will be described based on FIG. 1. However, the present invention is not limited to the specific embodiment below.

Figure 1:
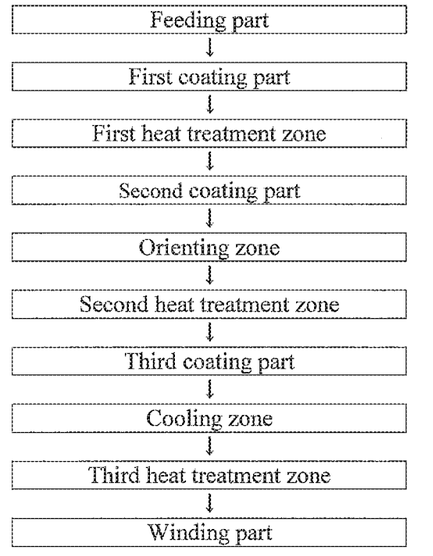
FIG. 1 shows an example (a schematic process diagram) of a specific embodiment of the process of manufacturing a magnetic tape.

FIG. 1 is a schematic process diagram showing a specific embodiment of the steps of manufacturing a magnetic tape having a backcoat layer on the other surface of a nonmagnetic support from that on which are sequentially present a nonmagnetic layer and a magnetic layer. In the embodiment shown in FIG. 1, a nonmagnetic support (long film) is continuously subjected to an operation of being fed by a feeding part and being wound up in a winding part. In various parts or various zones shown in FIG. 1, various processes such as coating, drying, and orienting can be conducted to form by sequential multilayer coating a nonmagnetic layer and a magnetic layer on one surface of a nonmagnetic support that is running, and a backcoat layer can be formed on the other surface. With the exception of containing a cooling zone, the manufacturing process can be identical to the one that is commonly conducted to manufacture a particulate magnetic recording medium.

Coating of the nonmagnetic layer coating composition is conducted in a first coating part on a nonmagnetic support that has been fed by a feeding part, forming a coating layer (step of coating the nonmagnetic layer forming composition).

In the first heat treatment zone, the coating layer that has been formed is heated to dry the coating layer (heating and drying step). The heating and drying step can be conducted by causing the nonmagnetic support on which the coating layer is present following the coating step through a heated atmosphere. The atmospheric temperature of the heated atmosphere is, for example, about 60 to 140° C. However, a temperature capable of drying the coating layer by volatizing the solvent will suffice, and there is no limit to the above range. It is also possible to optionally blow a heated gas onto the surface of the coating layer. This description also applies to the heating and drying step in the second heating and drying zone, and the heating and drying step in the third heating and drying zone, described further below.

Next, in the second coating part, the magnetic layer forming composition is coated on the surface of the nonmagnetic layer formed by conducting the heating and drying step in the first heating and drying zone, forming a coating layer (step of coating the magnetic layer forming composition).

Subsequently, while the coating layer of the magnetic layer forming composition is still wet, a step of orienting the ferromagnetic powder in the coating layer is conducted in an orienting zone. Reference can be made to Japanese Unexamined Patent Publication (KOKAI) No. 2010-231843, paragraph 0067, with regard to orientation processing.

The coating layer following the orientation processing is subjected to a heating and drying step in a second heat treatment zone.

Then, in a third coating part, a backcoat layer forming composition is coated to the surface on the opposite side of the nonmagnetic support from the surface on which the nonmagnetic layer and magnetic layer have been formed to form a coating layer (step of coating the backcoat layer forming composition).

Following the above coating step, the coating layer of the backcoat layer forming composition that has been formed by the coating step is cooled in a cooling zone (cooling step). For example, the nonmagnetic support on which has been formed the coating layer can be passed through a cooling atmosphere to conduct the cooling step. The temperature of the cooling atmosphere desirably falls within a range of −10° C. to 0° C., preferably within a range of −5° C. to 0° C. The duration of the cooling step (for example the time from when some portion of the coating layer is conveyed into the cooling zone to when it is conveyed out (also referred to as the "residence time" hereinafter)) is not specifically limited. The longer it is, the greater the tendency of the backcoat layer outer layer portion C—H derived C concentration to rise. Thus, in order to achieve an backcoat layer outer layer portion C—H derived C concentration that falls within the range set forth above, adjustment is desirably made by conducting a preliminary test as needed. It is also possible to blow a cooled gas onto the surface of the coating layer in the cooling step.

Subsequently, following the cooling step, the coating layer is heat treated and dried in the third heat treatment zone.

A magnetic tape can be obtained with a nonmagnetic layer and magnetic layer present in that order on one surface of a nonmagnetic support, and a backcoat layer present on the other surface. The magnetic tape obtained can be wound up on the winding part and then optionally subjected to various post-processing (various surface processing such as calendering). Known post-processing techniques in the manufacturing of particulate magnetic recording media can be applied without restriction. For example, reference can be made to Japanese Unexamined Patent Publication (KOKAI) No. 2010-231843, paragraph 0069, for a cutting step that is normally conducted after various post-processing.

Carbon black is thought to be less prone to adsorb to components selected from the group consisting of a fatty acid and a fatty acid amide than various nonmagnetic powders other than carbon black. Accordingly, the higher the ratio of carbon black in the nonmagnetic powder contained in the backcoat layer, the more these components tend to migrate to the outer layer portion from the interior of the backcoat layer, which is presumed to raise the backcoat layer outer layer portion C—H derived C concentration. For this reason, adjustment of the ratio of carbon black in the nonmagnetic powder in the backcoat layer can be used in addition to the cooling step as a means of controlling the backcoat layer outer layer portion C—H derived C concentration.

The magnetic tape according to an aspect of the present invention as set forth above can exhibit good running stability during recording and reproduction. The position error signal (PES) that is described in Examples further below can be an indicator of the running stability of a magnetic tape. The magnetic tape according to an aspect of the present invention, for example, can exhibit a PES of less than or equal to 70 nm.

EXAMPLES

The present invention will be described in greater detail below through Examples.

However, the present invention is not limited to the embodiments shown in Examples. The "parts" and "percent (%)" indicated below denote "weight parts" and "weight percent (%)".

The weight average molecular weights given below are values obtained by measurement by gel permeation chromatography (GPC) under the following conditions with polystyrene conversion.

GPS device: HLC-8120 (made by Tosoh)
Column: TSK gel Multipore HXL-M (made by Tosoh, 7.8 mm ID (inner diameter)×30.0 cm)
Eluent: Tetrahydrofuran (THF)

Examples 1 to 15, Comparative Examples 1 to 12

1. Preparation of Alumina Dispersion

To 100.0 parts of alumina powder (HIT-80 made by Sumitomo Chemical Co.) with an alpha conversion rate of about 65% and a BET specific surface area of 20 m²/g were admixed 3.0 parts of 2,3-dihydroxynaphthalene (made by Tokyo Kasei), 31.3 parts of a 32% solution (in a solvent in the form of a mixed solvent of methyl ethyl ketone and toluene) of polyester polyurethane resin (UR-4800 made by Toyobo (Japanese registered trademark) with polar groups in the form of $SO_3Na$ groups (polar group quantity: 80 meq/kg)), and 570.0 parts of a solvent in the form of a mixed solution of 1:1 (weight ratio) methyl ethyl ketone and cyclohexanone. The mixture was dispersed for 5 hours in a paint shaker in the presence of zirconia beads. Following dispersion, the dispersion and the beads were separated with a mesh, yielding an alumina dispersion.

2. Formula of Magnetic Layer Forming Composition

| (Magnetic liquid) | |
|---|---|
| Ferromagnetic powder | 100.0 parts |
| Ferromagnetic hexagonal barium ferrite powder or ferromagnetic metal powder (see Table 5) | |
| Polyurethane resin containing $SO_3Na$ groups | 14.0 parts |
| Weight average molecular weight: 70,000; $SO_3Na$ groups: 0.2 meq/g | |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (average particle size 120 nm) | 2.0 parts |
| Methyl ethyl ketone | 1.4 parts |
| (Other components) | |
| Stearic acid | See Table 5 |
| Amide stearate | See Table 5 |
| Butyl stearate | See Table 5 |
| Polyisocyanate | 2.5 parts |
| (Coronate (Japanese registered trademark) made by Nippon Polyurethane Industry Co., Ltd. | |
| (Finishing solvents) | |
| Cyclohexanone | 200.0 parts |
| Methyl ethyl ketone | 200.0 parts |

In Table 5, BF denotes ferromagnetic barium ferrite powder with an average particle size (average plate diameter) of 21 nm and MP denotes ferromagnetic metal powder with an average particle size (average major axis length) of 30 nm.

3. Formula of Nonmagnetic Layer Forming Composition

| Nonmagnetic inorganic powder: α-iron oxide | 100.0 parts |
|---|---|
| Average particle size (average major axis length): 0.15 μm | |
| Average acicular ratio: 7 | |
| BET specific surface area: 52 m²/g | |
| Carbon black | 20.0 parts |
| Average particle size: 20 nm | |
| Polyurethane resin containing $SO_3Na$ groups | 18.0 parts |
| Weight average molecular weight: 70,000 $SO_3Na$ groups: 0.2 meq/g | |
| Stearic acid | See Table 5 |
| Amide stearate | See Table 5 |
| Butyl stearate | See Table 5 |
| Cyclohexanone | 300.0 parts |
| Methyl ethyl ketone | 300.0 parts |

4. Formula of Backcoat Layer Forming Composition

| Nonmagnetic inorganic powder: α-iron oxide | See Table 5 |
|---|---|
| Average particle size (average major axis length): 0.15 μm | |
| Average acicular ratio: 7 | |
| BET specific surface area: 52 m²/g | |
| Carbon black | See Table 5 |
| Average particle size 20 nm | |
| Vinyl chloride copolymer | 13.0 parts |
| Polyurethane resin containing sulfonate groups | 6.0 parts |
| Phenylphosphonic acid | 3.0 parts |
| Stearic acid | See Table 5 |
| Amide stearate | See Table 5 |
| Butyl stearate | See Table 5 |
| Cyclohexanone | 155.0 parts |
| Methyl ethyl ketone | 155.0 parts |
| Polyisocyanate | 5.0 parts |
| Cyclohexanone | 200.0 parts |

Preparation of Various Layer Forming Compositions

The magnetic layer forming composition was prepared by the following method. The above magnetic liquid was prepared using a batch-type vertical sand mill to disperse (bead dispersion) the various components for 24 hours. Zirconia beads of 0.5 mm ϕ were employed as the dispersion beads. Using the above sand mill, the magnetic liquid that had been prepared and the above abrasive liquid were mixed with the other components (silica sol, other components, and finishing solvents) and dispersed with beads for 5 minutes. Subsequently, a batch-type ultrasonic device (20 kHz, 300 W) was used to conduct processing for 0.5 minutes (ultrasonic dispersion). Subsequently, filtration was conducted with a filter having an average pore size of 0.5 μm to prepare the magnetic layer forming composition.

The nonmagnetic layer forming composition was prepared by the following method. The various components excluding the stearic acid, cyclohexanone, and methyl ethyl ketone were dispersed for 24 hours in a batch-type vertical sand mill to obtain a dispersion. Zirconia beads of 0.5 mm ϕ were employed as the dispersion beads. Subsequently, the remaining components were added to the dispersion that had been obtained, and stirring was conducted in a dissolver. The dispersion thus obtained was filtered with a filter having an average pore size of 0.5 μm to prepare the nonmagnetic layer forming composition.

The backcoat layer forming composition was prepared by the following method. The various components excluding the polyisocyanate and cyclohexanone were kneaded and diluted in an open kneader. Subsequently, a horizontal-type bead mill disperser was used to conduct dispersion with 1 mm ϕ zirconia beads at a bead fill rate of 80% and a rotor tip speed of 10 m/s in 12 passes with a residence time of 2 minutes per pass. Subsequently, the remaining components were added to the dispersion that had been obtained and stirring was conducted in a dissolver. The dispersion thus obtained was filtered with a filter having an average pore diameter of 1 m to prepare the backcoat layer forming composition.

6. Fabricating the Magnetic Tape

A magnetic tape was fabricated by the specific embodiment shown in FIG. 1. Specifically, this was done as follows.

A polyethylene naphthalate support of the thickness indicated in Table 5 was fed by the feeding part. In the first coating part, the nonmagnetic layer forming composition prepared in 5. above was coated on one surface so as to yield the dry thickness indicated in Table 5, forming a coating layer. Next, the support on which the coating layer had been formed was passed through the first heat treatment zone which had an atmospheric temperature of 100° C. to conduct the heating and drying step, thereby forming the nonmagnetic layer.

Subsequently, in the second coating part, the magnetic layer forming composition prepared in 5. above was coated on the surface of the nonmagnetic layer so as to yield the dry thickness indicated in Table 5, forming a coating layer. While this coating layer was still wet (in a wet state), a magnetic field with a field strength of 0.3 T was vertically applied to the surface of the coating layer of the magnetic layer forming composition in an orienting zone to conduct a vertical orientation treatment, and then dried in a second heat treatment zone (atmospheric temperature 100° C.).

Subsequently, in the third coating part, the backcoat layer forming composition prepared in 5. above was coated on the opposite surface of the polyethylene naphthalate support from the surface on which the nonmagnetic layer and magnetic layer had been formed so as to yield the dry thickness indicated in Table 5, forming a coating layer. While the coating layer that had been formed was still wet, a cooling step was conducted by passing it through a cooling zone adjusted to an atmospheric temperature of 0° C. for the retention time indicated in Table 5. Subsequently, the coating layer was dried in a third heat treatment zone (atmospheric temperature 100° C.).

Subsequently, a calendering treatment (surface smoothing treatment) was conducted with a calender comprised solely of metal rolls at a speed of 80 m/minute, a linear pressure of 300 kg/cm, and a temperature of 100° C., followed by a 36 hour heat treatment in an environment with an atmospheric temperature of 70° C. Following the heat treatment, the product was slit to a width of ½ inch (0.0127 meter) to obtain a magnetic tape.

In Table 5, in Comparative Examples 1 to 3 and 5 to 12 for which "Not implemented" is recorded in the column of the cooling zone residence time, magnetic tapes were fabricated by a manufacturing process that did not include a cooling zone.

The thickness of the various layers of the magnetic tapes that had been fabricated and the nonmagnetic support as well as the total thickness of the magnetic tapes were determined by the following method. The various thicknesses were confirmed to be the thickness indicated in Table 5.

The cross section of the magnetic tapes in the direction of thickness was exposed by ion beam, and observation of the exposed cross section was conducted by a scanning electron microscope. In observing the cross section, the various thicknesses were obtained as the arithmetic average of thicknesses obtained in two spots in the direction of thickness.

1. Backcoat Layer Outer Layer Portion C—H Derived C Concentration

X-ray photoelectron spectroscopy was conducted with an ESCA device on the backcoat layer side surface (measurement region: 300 μm×700 μm) of the magnetic tapes of Examples and Comparative Examples by the following method. The backcoat layer outer layer portion C—H derived C concentration was calculated from the analysis results. The calculated values are given in Table 5.

(Analytic and Calculation Methods)

The measurements of (1) to (3) below were all conducted under the conditions shown in Table 1.

TABLE 1

| | |
|---|---|
| Device | AXIS-ULTRA made by Shimadzu Corp. |
| Excitation X-ray source | Monochromatized Al-Kα radiation (output: 15 kV, 20 mA) |
| Analyzer mode | Spectrum |
| Lens mode | Hybrid (analysis area: 300 μm × 700 μm) |
| Neutralizing electron gun for charge compensation (charge neutralizer) | On (used) |
| Photoelectron take-off angle | 10 deg. or 90 deg. (angle of device relative to sample surface) |

(1) Wide Scan Measurement

The types of elements detected by wide scan measurement (measurement conditions: see Table 2) by ESCA on the backcoat layer side surface of the magnetic tape were examined (qualitative analysis).

TABLE 2

| Scan range | Pass energy | Energy resolution (step) | Pickup time (Dwell) | Cumulative number (Sweeps) |
|---|---|---|---|---|
| 0 to 1200 eV | 160 eV | 1 eV/step | 100 ms/step | 5 |

(2) Narrow Scan Measurement

Narrow scan measurement (measurement conditions: see Table 3) was conducted for each of the elements detected in (1) above. The auxiliary data processing software of the device (Vision 2.2.6) was employed to calculate the atomic concentration (unit: atom %) of each element detected in the peak areas of the various elements. The C concentration was also calculated from the peak area of the C1s spectrum.

TABLE 3

| Spectrum[Note 1] | Scan range | Pass energy | Energy resolution (Step) | Pickup time (Dwell) | Cumulative number (Sweeps)[Note 2] |
|---|---|---|---|---|---|
| C1s | 276 to 296 eV | 80 eV | 0.1 eV/step | 100 ms/step | 3 |
| Cl2p | 190 to 212 eV | 80 eV | 0.1 eV/step | 100 ms/step | 5 |
| N1s | 390 to 410 eV | 80 eV | 0.1 eV/step | 100 ms/step | 5 |
| O1s | 521 to 541 eV | 80 eV | 0.1 eV/step | 100 ms/step | 3 |
| Fe2p | 700 to 740 eV | 80 eV | 0.1 eV/step | 100 ms/step | 3 |
| Ba3d | 765 to 815 eV | 80 eV | 0.1 eV/step | 100 ms/step | 3 |
| Al2p | 64 to 84 eV | 80 eV | 0.1 eV/step | 100 ms/step | 5 |
| Y3d | 148 to 168 eV | 80 eV | 0.1 eV/step | 100 ms/step | 3 |
| P2p | 120 to 140 eV | 80 eV | 0.1 eV/step | 100 ms/step | 5 |
| Zr3d | 171 to 191 eV | 80 eV | 0.1 eV/step | 100 ms/step | 5 |
| Bi4f | 151 to 171 eV | 80 eV | 0.1 eV/step | 100 ms/step | 3 |
| Sn3d | 477 to 502 eV | 80 eV | 0.1 eV/step | 100 ms/step | 5 |

TABLE 3-continued

| Spectrum[Note 1] | Scan range | Pass energy | Energy resolution (Step) | Pickup time (Dwell) | Cumulative number (Sweeps)[Note 2] |
|---|---|---|---|---|---|
| Si2p | 90 to 110 eV | 80 eV | 0.1 eV/step | 100 ms/step | 5 |
| S2p | 153 to 173 eV | 80 eV | 0.1 eV/step | 100 ms/step | 5 |

[Note 1] The spectrum (type pf element) shown in Table 3 is an example. When an element that is not shown in Table 3 was detected in the qualitative analysis of (1), identical narrow scan measurements were conducted over a scan range containing all of the spectra of elements detected.
[Note 2] For spectra with good signal-to-noise (S/N) ratios, measurements were taken a total of three times. However, the quantitative results were not affected for any of the spectra when measurements were taken a total of five times.

4. Obtaining the C1s Spectrum

C1s spectra were obtained under the measurement conditions given in Table 4. The auxiliary data processing software (Vision 2.2.6) of the device was used to compensate for the shift (physical shift) due to the sample charge in the C1s spectrum obtained. The same software was then used to conduct fitting (peak separation) of the C1s spectrum. In peak separation, a Gauss-Lorentz complex function (Gauss component 70%, Lorentz component 30%) was employed, fitting of the C1s spectrum was conducted by the nonlinear least squares method, and the proportion of the C—H peak accounted for by the C1s spectrum (peak area ratio) was calculated. The calculated C—H peak area ratio was multiplied by the C concentration obtained in (2) above to calculate the C—H derived C concentration.

TABLE 4

| Spectrum | Scan range | Pass energy | Energy resolution (Step) | Pickup time (Dwell) | Cumulative number (Sweeps) |
|---|---|---|---|---|---|
| C1s | 276 to 296 eV | 10 eV | 0.1 eV/step | 200 ms/step | 20 |

The arithmetic average of values obtained by conducting the above processing three times at different positions on the surface of the magnetic tape on the backcoat layer side was adopted as the backcoat layer outer layer portion C—H derived C concentration. The values calculated are given in Table 5.

2. Determining the Contribution of Fatty Acid and Fatty Acid Amide to the Backcoat Layer Outer Layer Portion C—H Derived C Concentration (1) Two magnetic tapes (sample tapes) were fabricated by the same method as in Example 1. One of the sample tapes was measured with the above ESCA device, and the other was solvent extracted (solvent: methanol) in an unmeasured state.

Gas chromatography analysis of the quantities of the fatty acid, fatty acid amide, and fatty acid ester in the solutions obtained by extraction revealed almost no differences in the quantitative values of the two sample tapes for the fatty acid (stearic acid) and fatty acid amide (amide stearate). However, the quantitative value of the fatty acid ester (butyl stearate) in the sample tape following measurement was markedly lower than in the unmeasured sample tape. This was attributed to the fatty acid ester having volatized in the vacuum chamber in which the sample being measured was placed during measurement in the ESCA device.

(2) Among the components that were incorporated into the backcoat layer forming composition, the organic compounds excluding solvents were stearic acid, amide stearate, butyl stearate, vinyl chloride copolymer, polyurethane resin, and phenylphosphonic acid. Of these components, butyl stearate, as set forth above, was determined not to have affected the backcoat layer outer layer portion C—H derived C concentration based on the results of (1) above.

The influences of vinyl chloride copolymer, polyurethane resin, and phenylphosphonic acid on the backcoat layer outer layer portion C—H derived C concentration were determined by the following method.

C1s spectra were obtained by the same method as above for the vinyl chloride copolymer, polyurethane resin, and phenylphosphonic acid employed in Example 1. The spectra obtained were processed as set forth above to separate out the peaks located in the vicinity of a bond energy of 286 eV and the C—H peak. The ratios accounted for by the individual separated peaks (peak area ratios) in the C1s spectrum were calculated, and the peak area ratio of the C—H peak to the peaks located in the vicinity of a bond energy of 286 eV was calculated.

Next, the peaks positioned in the vicinity of a bond energy of 286 eV were separated by the process set forth above in the C1s spectrum obtained in Example 1. While vinyl chloride copolymer, polyurethane resin, and phenylphosphonic acid have peaks positioned in the vicinity of a bond energy of 286 eV in the C1s spectrum, fatty acid (stearic acid) and fatty acid amide (amide stearate) do not have peaks at this position. Accordingly, it was possible to determine that the peaks positioned in the vicinity of a bond energy of 286 eV in the C1s spectrum obtained in Example 1 were derived from vinyl chloride copolymer, polyurethane resin, and phenyl phosphonic acid. Using these peaks, based on the peak area ratio calculated above, the amount of contribution to the C—H peak of the C1s spectrum obtained in Example 1 by vinyl chloride copolymer, polyurethane resin, and phenylphosphonic acid was calculated to be about 10%. Based on this result, the greater portion (about 90%) of the C—H peak in the C1s spectrum obtained in Example 1 was determined to be derived from fatty acid (stearic acid) and fatty acid amide (amide stearate).

Based on the above results, the backcoat layer outer layer portion C—H derived C concentration was demonstrated to be an indicator of the amount of fatty acid and fatty acid amide present.

3. Evaluation of Running Stability

The magnetic tapes of Examples and Comparative Examples were run on a reel tester and the amount by which a magnetic recording head of the linear tape-open generation 6 (LTO G6) standard was unable to track vertical magnetic tape movement (PES) was determined by obtaining and analyzing servo signals from the magnetic tapes with a digital storage oscilloscope. The PES that was measured by this method was a value that was affected by running stability. The lower the value, the better the running stability indicated. A value of less than or equal to 70 nm can be determined to indicate good running stability. The results are given in Table 5.

TABLE 5

|  |  | Example 1 | Example 2 | Example 3 | Example 4 | Example 5 |
|---|---|---|---|---|---|---|
| Ferromagnetic powder | | BF | BF | BF | BF | BF |
| Magnetic layer thickness | | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm |
| Nonmagnetic support thickness | | 3.80 μm | 3.80 μm | 3.80 μm | 3.80 μm | 3.80 μm |
| Backcoat layer thickness | | 0.40 μm | 0.40 μm | 0.40 μm | 0.40 μm | 0.40 μm |
| Total thickness of magnetic tape | | 4.80 μm | 4.80 μm | 4.80 μm | 4.80 μm | 4.80 μm |
| Residence time in cooling zone after coating backcoat layer coating composition | | 5 sec. | 50 sec. | 100 sec. | 180 sec. | 5 sec. |
| Magnetic layer forming composition | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Nonmagnetic layer forming composition | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Backcoat layer forming composition | α-iron oxide/part | 80.0 | 80.0 | 80.0 | 80.0 | 50.0 |
| | Carbon black/part | 20.0 | 20.0 | 20.0 | 20.0 | 50.0 |
| | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Backcoat layer outer layer portion C—H derived C concentration | | 40 atom % | 48 atom % | 55 atom % | 60 atom % | 43 atom % |
| PES | | 55 nm | 47 nm | 43 nm | 38 nm | 58 nm |

|  |  | Example 6 | Example 7 | Example 8 | Example 9 | Example 10 |
|---|---|---|---|---|---|---|
| Ferromagnetic powder | | BF | BF | MP | BF | BF |
| Magnetic layer thickness | | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm |
| Nonmagnetic support thickness | | 3.80 μm | 3.80 μm | 3.80 μm | 3.40 μm | 3.80 μm |
| Backcoat layer thickness | | 0.40 μm | 0.40 μm | 0.40 μm | 0.30 μm | 0.40 μm |
| Total thickness of magnetic tape | | 4.80 μm | 4.80 μm | 4.80 μm | 4.30 μm | 4.80 μm |
| Residence time in cooling zone after coating backcoat layer coating composition | | 5 sec. | 5 sec. | 5 sec. | 5 sec. | 1 sec. |
| Magnetic layer forming composition | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Nonmagnetic layer forming composition | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Backcoat layer forming composition | α-iron oxide/part | 20.0 | 0 | 80.0 | 80.0 | 80.0 |
| | Carbon black/part | 80.0 | 100.0 | 20.0 | 20.0 | 20.0 |
| | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Backcoat layer outer layer portion C—H derived C concentration | | 45 atom % | 46 atom % | 40 atom % | 44 atom % | 35 atom % |
| PES | | 60 nm | 59 nm | 56 nm | 62 nm | 62 nm |

|  |  | Example 11 | Example 12 | Example 13 | Example 14 | Example 15 |
|---|---|---|---|---|---|---|
| Ferromagnetic powder | | BF | BF | BF | BF | BF |
| Magnetic layer thickness | | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm |
| Nonmagnetic support thickness | | 3.80 μm | 3.80 μm | 3.80 μm | 3.80 μm | 3.80 μm |
| Backcoat layer thickness | | 0.40 μm | 0.40 μm | 0.40 μm | 0.40 μm | 0.40 μm |
| Total thickness of magnetic tape | | 4.80 μm | 4.80 μm | 4.80 μm | 4.80 μm | 4.80 μm |
| Residence time in cooling zone after coating backcoat layer coating composition | | 5 sec. | 5 sec. | 5 sec. | 5 sec. | 5 sec. |
| Magnetic layer forming composition | Stearic acid/part | 2.0 | 2.0 | 6 | 2.0 | 2.0 |
| | Amide stearate/part | 0.2 | 0.2 | 1.0 | 0.2 | 0.2 |
| | Butyl stearate/part | 2.0 | 2.0 | 2.0 | 2.0 | 2.0 |
| Nonmagnetic layer forming composition | Stearic acid/part | 2.0 | 2.0 | 2.0 | 2.0 | 2.0 |
| | Amide stearate/part | 0.2 | 0.2 | 0.2 | 0.2 | 0.2 |
| | Butyl stearate/part | 2.0 | 2.0 | 2.0 | 2.0 | 2.0 |
| Backcoat layer forming composition | α-iron oxide/part | 80.0 | 80.0 | 80.0 | 80.0 | 80.0 |
| | Carbon black/part | 20.0 | 20.0 | 20.0 | 20.0 | 20.0 |
| | Stearic acid/part | 2.0 | 2.0 | 2.0 | 4.0 | 6.0 |
| | Amide stearate/part | 0.2 | 0.2 | 0.2 | 0.5 | 1.0 |
| | Butyl stearate/part | 4.0 | 6.0 | 2.0 | 2.0 | 2.0 |
| Backcoat layer outer layer portion C—H derived C concentration | | 40 atom % | 40 atom % | 40 atom % | 40 atom % | 40 atom % |
| PES | | 57 nm | 58 nm | 55 nm | 53 nm | 55 nm |

TABLE 5-continued

|  |  | Comp. Ex. 1 | Comp. Ex. 2 | Comp. Ex. 3 | Comp. Ex. 4 | Comp. Ex. 5 |
|---|---|---|---|---|---|---|
| Ferromagnetic powder | | BF | BF | BF | BF | BF |
| Magnetic layer thickness | | 0.10 μm | 0.10 μm | 0.10 μm | 0.10 μm | 0.10 μm |
| Nonmagnetic layer thickness | | 1.00 μm | 1.00 μm | 0.50 μm | 0.50 μm | 0.50 μm |
| Nonmagnetic support thickness | | 4.30 μm | 3.60 μm | 4.00 μm | 4.00 μm | 3.80 μm |
| Backcoat layer thickness | | 0.60 μm | 0.60 μm | 0.40 μm | 0.40 μm | 0.40 μm |
| Total thickness of magnetic tape | | 6.00 μm | 5.30 μm | 5.00 μm | 5.00 μm | 4.80 μm |
| Residence time in cooling zone after coating backcoat layer coating composition | | Not implemented | Not implemented | Not implemented | 5 sec. | Not implemented |
| Magnetic layer forming composition | Stearic acid/part | 2.0 | 2.0 | 2.0 | 2.0 | 2.0 |
|  | Amide stearate/part | 0.2 | 0.2 | 0.2 | 0.2 | 0.2 |
|  | Butyl stearate/part | 2.0 | 2.0 | 2.0 | 2.0 | 2.0 |
| Nonmagnetic layer forming composition | Stearic acid/part | 2.0 | 2.0 | 2.0 | 2.0 | 2.0 |
|  | Amide stearate/part | 0.2 | 0.2 | 0.2 | 0.2 | 0.2 |
|  | Butyl stearate/part | 2.0 | 2.0 | 2.0 | 2.0 | 2.0 |
| Backcoat layer forming composition | α-iron oxide/part | 80.0 | 80.0 | 80.0 | 80.0 | 80.0 |
|  | Carbon black/part | 20.0 | 20.0 | 20.0 | 20.0 | 20.0 |
|  | Stearic acid/part | 2.0 | 2.0 | 2.0 | 2.0 | 2.0 |
|  | Amide stearate/part | 0.2 | 0.2 | 0.2 | 0.2 | 0.2 |
|  | Butyl stearate/part | 2.0 | 2.0 | 2.0 | 2.0 | 2.0 |
| Backcoat layer outer layer portion C—H derived C concentration | | 25 atom % | 25 atom % | 25 atom % | 40 atom % | 25 atom % |
| PES | | 45 nm | 48 nm | 52 nm | 52 nm | 85 nm |

|  |  | Comp. Ex. 6 | Comp. Ex. 7 | Comp. Ex. 8 | Comp. Ex. 9 | Comp. Ex. 10 |
|---|---|---|---|---|---|---|
| Ferromagnetic powder | | BF | BF | BF | BF | BF |
| Magnetic layer thickness | | 0.10 μm | 0.10 μm | 0.10 μm | 0.10 μm | 0.10 μm |
| Nonmagnetic layer thickness | | 0.50 μm | 0.50 μm | 0.50 μm | 0.50 μm | 0.50 μm |
| Nonmagnetic support thickness | | 3.80 μm | 3.80 μm | 3.80 μm | 3.80 μm | 3.80 μm |
| Backcoat layer thickness | | 0.40 μm | 0.40 μm | 0.40 μm | 0.40 μm | 0.40 μm |
| Total thickness of magnetic tape | | 4.80 μm | 4.80 μm | 4.80 μm | 4.80 μm | 4.80 μm |
| Residence time in cooling zone after coating backcoat layer coating composition | | Not implemented | Not implemented | Not implemented | Not implemented | Not implemented |
| Magnetic layer forming composition | Stearic acid/part | 2.0 | 2.0 | 6.0 | 2.0 | 2.0 |
|  | Amide stearate/part | 0.2 | 0.2 | 1.0 | 0.2 | 0.2 |
|  | Butyl stearate/part | 2.0 | 2.0 | 2.0 | 2.0 | 2.0 |
| Nonmagnetic layer forming composition | Stearic acid/part | 2.0 | 2.0 | 6.0 | 2.0 | 2.0 |
|  | Amide stearate/part | 0.2 | 0.2 | 1.0 | 0.2 | 0.2 |
|  | Butyl stearate/part | 2.0 | 2.0 | 2.0 | 2.0 | 2.0 |
| Backcoat layer forming composition | α-iron oxide/part | 80.0 | 80.0 | 80.0 | 50.0 | 20.0 |
|  | Carbon black/part | 20.0 | 20.0 | 20.0 | 50.0 | 80.0 |
|  | Stearic acid/part | 4.0 | 6.0 | 2.0 | 2.0 | 2.0 |
|  | Amide stearate/part | 0.5 | 1.0 | 0.2 | 0.2 | 0.2 |
|  | Butyl stearate/part | 2.0 | 2.0 | 2.0 | 2.0 | 2.0 |
| Backcoat layer outer layer portion C—H derived C concentration | | 25 atom % | 25 atom % | 25 atom % | 26 atom % | 26 atom % |
| PES | | 85 nm | 87 nm | 85 nm | 82 nm | 82 nm |

|  |  | Comp. Ex. 11 | Comp. Ex. 12 |
|---|---|---|---|
| Ferromagnetic powder | | BF | BF |
| Magnetic layer thickness | | 0.10 μm | 0.10 μm |
| Nonmagnetic layer thickness | | 0.50 μm | 0.50 μm |
| Nonmagnetic support thickness | | 3.80 μm | 3.40 μm |
| Backcoat layer thickness | | 0.40 μm | 0.30 μm |
| Total thickness of magnetic tape | | 4.80 μm | 4.30 μm |
| Residence time in cooling zone after coating backcoat layer coating composition | | Not implemented | Not implemented |
| Magnetic layer forming composition | Stearic acid/part | 2.0 | 2.0 |
|  | Amide stearate/part | 0.2 | 0.2 |
|  | Butyl stearate/part | 2.0 | 2.0 |
| Nonmagnetic layer forming composition | Stearic acid/part | 2.0 | 2.0 |
|  | Amide stearate/part | 0.2 | 0.2 |
|  | Butyl stearate/part | 2.0 | 2.0 |
| Backcoat layer forming composition | α-iron oxide/part | 0 | 80.0 |
|  | Carbon black/part | 100.0 | 20.0 |
|  | Stearic acid/part | 2.0 | 2.0 |
|  | Amide stearate/part | 0.2 | 0.2 |
|  | Butyl stearate/part | 2.0 | 2.0 |
| Backcoat layer outer layer portion C—H derived C concentration | | 28 atom % | 23 atom % |
| PES | | 91 nm | 107 nm |

The following items can be determined from the results given in Table 5:

(1) In the magnetic tapes of Comparative Examples 1 to 4 which had total thicknesses in excess of 4.80 μm, regardless of whether the backcoat layer outer layer portion C—H derived C concentration fell inside or outside the range of 35 to 60 atom %, the PES was less than or equal to 70 nm. That is, in magnetic tapes with a total thickness exceeding 4.80 μm, no correlation between the backcoat layer outer layer portion C—H derived C concentration and running stability was observed.

(2) By contrast, in the magnetic tapes of Examples 1 to 15 and Comparative Examples 5 to 12 which had total thicknesses of less than or equal to 4.80 μm, running stability was determined to deteriorate when the backcoat layer outer layer portion C—H derived C concentration was less than 35 atom %, while good running stability was achieved when the backcoat layer outer layer portion C—H derived C concentration fell within the range of 35 to 60 atom %.

An aspect of the present invention is useful in the field of manufacturing magnetic tapes such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
   which comprises on one surface of a nonmagnetic support a magnetic layer comprising ferromagnetic powder and binder, and on the other surface of the nonmagnetic support, a backcoat layer comprising nonmagnetic powder and binder, wherein
   a total thickness of the magnetic tape is less than or equal to 4.80 μm,
   the backcoat layer comprises one or more components selected from the group consisting of a fatty acid and a fatty acid amide, and
   a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape ranges from 35 to 60 atom %.

2. The magnetic tape according to claim 1, wherein the C—H derived carbon, C, concentration ranges from 40 to 60 atom %.

3. The magnetic tape according to claim 1, wherein the nonmagnetic powder comprised in the backcoat layer is selected from the group consisting of carbon black and nonmagnetic inorganic oxide powder.

4. The magnetic tape according to claim 3, wherein the nonmagnetic powder comprised in the backcoat layer comprises at least carbon black.

5. The magnetic tape according to claim 1, wherein the backcoat layer further comprises a fatty acid ester.

6. The magnetic tape according to claim 1, wherein the ferromagnetic powder comprised in the magnetic layer is selected from the group consisting of ferromagnetic hexagonal ferrite powder and ferromagnetic metal powder.

7. The magnetic tape according to claim 1, which comprises a nonmagnetic layer comprising nonmagnetic powder and binder between the nonmagnetic support and the magnetic layer.

8. A method of manufacturing a magnetic tape,
   wherein the magnetic tape is a magnetic tape comprising on one surface of a nonmagnetic support a magnetic layer comprising ferromagnetic powder and binder, and on the other surface of the nonmagnetic support, a backcoat layer comprising nonmagnetic powder and binder, wherein
   a total thickness of the magnetic tape is less than or equal to 4.80 μm,
   the backcoat layer comprises one or more components selected from the group consisting of a fatty acid and a fatty acid amide, and
   a C—H derived carbon, C, concentration calculated from a C—H peak area ratio in a C1s spectrum obtained by X-ray photoelectron spectroscopy conducted at a photoelectron take-off angle of 10 degrees on a surface on the backcoat layer side of the magnetic tape ranges from 35 to 60 atom %, and wherein
   the method comprises at least forming the magnetic layer and forming the backcoat layer, and
   the forming of the backcoat layer comprises:
   a coating step of forming a coating layer by coating a backcoat layer forming composition comprising one or more components selected from the group consisting of a fatty acid and a fatty acid amide, nonmagnetic powder, binder, and solvent on a surface of a nonmagnetic support; and
   a heating and drying step of drying the coating layer by a heat treatment;
   with a cooling step of cooling the coating layer being conducted between the coating step and the heating and drying step.

9. The method of manufacturing a magnetic tape according to claim 8,
   wherein the cooling step is conducted by placing the coating layer in a cooling environment of −10° C. to 0° C.

10. The method of manufacturing a magnetic tape according to claim 8,
    wherein the solvent comprised in the backcoat layer forming composition comprises ketone solvent.

11. The method of manufacturing a magnetic tape according to claim 8,
    wherein the backcoat layer forming composition further comprises a fatty acid ester.

12. The method of manufacturing a magnetic tape according to claim 8, wherein, in the magnetic tape, the C—H derived carbon, C, concentration ranges from 40 to 60 atom %.

13. The method of manufacturing a magnetic tape according to claim 8,
wherein, in the magnetic tape, the nonmagnetic powder comprised in the backcoat layer is selected from the group consisting of carbon black and nonmagnetic inorganic oxide powder.

14. The method of manufacturing a magnetic tape according to claim 13,
wherein, in the magnetic tape, the nonmagnetic powder comprised in the backcoat layer comprises at least carbon black.

15. The method of manufacturing a magnetic tape according to claim 8,
wherein, in the magnetic tape, the ferromagnetic powder comprised in the magnetic layer is selected from the group consisting of ferromagnetic hexagonal ferrite powder and ferromagnetic metal powder.

16. The method of manufacturing a magnetic tape according to claim 8,
which further comprises forming a nonmagnetic layer,
wherein the magnetic tape comprises a nonmagnetic layer comprising nonmagnetic powder and binder between the nonmagnetic support and the magnetic layer.

* * * * *